United States Patent
Pritchard, Jr. et al.

(10) Patent No.: US 9,518,513 B2
(45) Date of Patent: Dec. 13, 2016

(54) GAS TURBINE ENGINE TWO DEGREE OF FREEDOM VARIABLE BLEED VALVE FOR ICE EXTRACTION

(71) Applicants: Byron Andrew Pritchard, Jr., Loveland, OH (US); Paul Alfred Pezzi, Cincinnati, OH (US); George Gould Cunningham, III, Lawrenceburg, IN (US); Thomas Ory Moniz, Loveland, OH (US); Steven Alan Ross, Cincinnati, OH (US); Raymond Gust Holm, Lebanon, OH (US)

(72) Inventors: Byron Andrew Pritchard, Jr., Loveland, OH (US); Paul Alfred Pezzi, Cincinnati, OH (US); George Gould Cunningham, III, Lawrenceburg, IN (US); Thomas Ory Moniz, Loveland, OH (US); Steven Alan Ross, Cincinnati, OH (US); Raymond Gust Holm, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 13/750,346

(22) Filed: Jan. 25, 2013

(65) Prior Publication Data
US 2014/0245747 A1  Sep. 4, 2014

Related U.S. Application Data

(60) Provisional application No. 61/712,944, filed on Oct. 12, 2012.

(51) Int. Cl.
*F02C 6/08* (2006.01)
*F02C 9/18* (2006.01)
(Continued)

(52) U.S. Cl.
CPC ............... *F02C 9/18* (2013.01); *F01D 17/105* (2013.01); *F02C 7/052* (2013.01); *F04D 27/023* (2013.01);
(Continued)

(58) Field of Classification Search
CPC ............... F02C 9/18; F02C 3/113; F02C 7/18
(Continued)

(56) References Cited

U.S. PATENT DOCUMENTS 3,638,428 A * 2/1972 Shipley ............... F04D 27/0215
    415/145
4,250,703 A   2/1981 Norris et al.
(Continued)

FOREIGN PATENT DOCUMENTS

EP  0374004 A1  6/1990
EP  0511770 A1  11/1992
(Continued)

OTHER PUBLICATIONS

PCT Search Report and Written Opinion from corresponding PCT Application No. PCT/US2013/059872 dated Jul. 3, 2014.
(Continued)

*Primary Examiner* — Thomas Denion
*Assistant Examiner* — Matthew T Largi
(74) *Attorney, Agent, or Firm* — General Electric Company; Pamela A. Kachur

(57) ABSTRACT

A gas turbine engine variable bleed apparatus includes a variable bleed valve door disposed in a bleed inlet in a transition duct, rotatable about two or more separate pivot points, operable to open and close an aft bleed slot extending outwardly from transition duct, and operable to open and close a forward bleed slot extending inwardly into transition duct. Door is operable to transition between a first position with aft bleed slot open and forward bleed slot closed to a
(Continued)

second position with aft bleed slot closed and forward bleed slot open without fully closing door. Door is rotatable about an axis translatable between the two or more separate pivot points. Transition duct having a transition duct conical angle at least about 10 degrees greater than a booster conical angle of a booster outer shroud upstream of transition duct.

33 Claims, 10 Drawing Sheets

(51) Int. Cl.
      *F01D 17/10*     (2006.01)
      *F02C 7/052*     (2006.01)
      *F04D 27/02*     (2006.01)

(52) U.S. Cl.
      CPC ....... *F04D 27/0215* (2013.01); *F05D 2250/42* (2013.01)

(58) Field of Classification Search
      USPC .................................................. 60/782, 785
      See application file for complete search history.

(56) References Cited

U.S. PATENT DOCUMENTS

| | | | |
|---|---|---|---|
| 4,463,552 A | 8/1984 | Monhardt et al. | |
| 4,715,779 A * | 12/1987 | Suciu | F01D 17/105 251/229 |
| 5,000,212 A * | 3/1991 | Tervo | F16K 1/221 137/1 |
| 5,044,153 A * | 9/1991 | Mouton | F02C 7/052 415/121.2 |
| 5,119,625 A | 6/1992 | Glowacki | |
| 5,123,240 A | 6/1992 | Frost et al. | |
| 5,261,228 A | 11/1993 | Shuba | |
| 5,279,109 A | 1/1994 | Liu et al. | |
| 5,351,473 A | 10/1994 | Shuba | |
| 5,845,482 A * | 12/1998 | Carscallen | F01D 17/105 60/226.3 |
| 6,122,905 A * | 9/2000 | Liu | F01D 17/105 60/785 |
| 6,742,324 B2 | 6/2004 | Bachelder et al. | |
| 7,594,403 B2 * | 9/2009 | Cadieux | F01D 17/105 60/782 |
| 7,624,581 B2 | 12/2009 | Moniz | |
| 8,333,546 B2 * | 12/2012 | Colotte | F01D 17/16 415/149.4 |
| 2007/0234704 A1 | 10/2007 | Moniz et al. | |
| 2009/0056307 A1 | 3/2009 | Mons | |
| 2012/0070271 A1 * | 3/2012 | Urban | F02C 6/08 415/145 |

FOREIGN PATENT DOCUMENTS

| | | |
|---|---|---|
| EP | 2431590 A2 | 3/2012 |
| FR | 2961251 A1 | 12/2011 |

OTHER PUBLICATIONS

Unofficial translation of Chinese Office Action issued in connection to corresponding CN Application 201380053019.6. Office Action is dated Jan. 14, 2016.

* cited by examiner

GAS TURBINE ENGINE TWO DEGREE OF FREEDOM VARIABLE BLEED VALVE FOR ICE EXTRACTION

CROSS REFERENCE TO RELATED APPLICATIONS

The present application claims priority to U.S. Provisional Patent Application Ser. No. 61/712,944, entitled "GAS TURBINE ENGINE TWO DEGREE OF FREEDOM VARIABLE BLEED VALVE FOR ICE EXTRACTION", filed Oct. 12, 2012, the disclosure of which is hereby incorporated by reference.

BACKGROUND OF THE INVENTION

Field of the Invention

The invention relates to gas turbine engine variable bleed valves and, more particularly, to such valves used to prevent surge and remove ice from duct between booster and core engine compressor.

Description of Related Art

It is well known in the gas turbine engine field to provide variable bleed valves (VBVs), typically, doors that open to provide a bleed path to bleed off compressed air between the booster and core engine compressor of gas turbine engines. The air is often bled from what is referred to as a gooseneck flowpath between the booster and core engine compressor. Aircraft fan jet gas turbine engines and marine and industrial derivatives of such engines have employed various forms of curved flowpaths and VBV bleed doors that are retracted into the flowpath casing so as to form an entrance to a bleed duct that bleeds booster or low pressure compressor discharge airflow to draw particles out of the flowpath in a manner such as that disclosed in U.S. Pat. No. 4,463,552 entitled "Combined Surge Bleed and Dust Removal System for a Fan-Jet Engine" by Monhardt et al.

Because the bleed flow abruptly curves away from the direction of the compressor flow, it is very difficult to hold larger particles in the bleed flow because of their momentum. This problem is common to aircraft, marine, and ground based gas turbine engines. Turbofan jet engines, such as the General Electric CF6 and GE90 series of engines, have in series relationship a fan, a booster, and a core engine compressor, whereby a portion of the air passing through the fan flows into the booster and then the core engine compressor. In order to match the inlet airflow of the core engine compressor to its flight operational requirements and to prevent booster stall, a booster variable bleed valve (VBV) is provided in the form of a booster bleed duct having an inlet between the booster and the core engine compressor and an outlet to the fan duct.

Opening and closing of the booster bleed duct is conventionally provided by a circumferentially disposed plurality of pivotal doors that retract into the engine structure or casing and are operated by a single unison ring powered by one or more fuel powered actuators. Bellcrank linkages operably connect the retracting pivotal bleed doors to the unison ring. An example of such a stall prevention system using a retracting pivotal door, as compared to a sliding door or valve in the Monhardt patent, is disclosed in U.S. Pat. No. 3,638,428 entitled "Bypass Valve Mechanism" by Shipley et al. and assigned to the same assignee as the present invention and incorporated herein by reference. The operation of the VBV is scheduled by the engine controller, either a mechanical or digital electronic type may be used. The problem associated with conventional bleed valve ducts and valve doors is that larger particles and amounts of particles such as ice are often not drawn into the bleed duct. It is desirable to have an engine that provides the ability to remove large amounts of ice from the compressor airflow for accels and at high speeds to prevent icing stalls and flame-outs and as well. It is desirable to efficiently bleed air between the booster and the core engine compressor to prevent booster stalls. Thus, it is highly desirable to remove ice from the gooseneck flowpath during accels to high speed without removing core airflow or minimizing the amount of core airflow that is removed.

Modern aircraft employ fewer of the higher thrust, fuel efficient, very-high-bypass engines such as the twin engine Boeing 767 aircraft. Aircraft with fewer engines require more total take-off power and more power per engine in order to satisfy the requirement of being able to fly with one engine out. Therefore, the engines are set to lower power settings resulting in less engine airflow during descent when all engines are operational. This results in high water content for engine airflow since the amount of ice, hail, or water that gets into the engine is the same so long as the aircraft speed remains the same.

On the other hand, higher bypass ratio engines have smaller core flow and larger bullet-nose frontal area. This means more ice, hail, or water gets through the compressor into the combustor resulting in higher water content for the air. These two fundamental phenomena combine to cause substantial increase of water-to-air ratio in the combustor resulting in such aircraft engines being more susceptible to engine flame out problem in rain or hail storms. The higher bypass ratio engines, having the large frontal area, also result in increased ice accretion on the booster inlet and booster stages during idle operation within an icing environment. This results in increased ice shed during the acceleration, including sheds at or near maximum power operation. It also increases the risk of compressor stall due to the ice sheds and more particularly to high speed rotor ice sheds, which historically has been an issue on two-shaft large engines, and will continue to be an issue on future large engines.

Modern high bypass ratio engines incorporate higher pressure core compressors and lower pressure boosters and, thus, produce less pressure difference between the booster exit and the fan bypass duct. This increases the difficulty of bleeding sufficient amounts of air from downstream of the booster to the fan bypass duct for protecting boosters from stall. The booster stall margin is controlled by opening the VBV doors to dump some of the booster flow overboard so as to control the booster operating line to a point below its stall line.

Thus, it is highly desirable to have a variable bleed valve and system for high bypass ratio engines incorporate higher pressure core compressors and lower pressure boosters bleed sufficient amounts of air from downstream of the booster for protecting boosters from stall. It is also highly desirable to have a variable bleed valve and system for such high bypass ratio engines able to prevent ice sheds and more particularly high speed rotor ice sheds from causing compressor stall or flame quenching in the combustor.

SUMMARY OF THE INVENTION

A gas turbine engine variable bleed apparatus includes a variable bleed valve with a variable bleed valve door disposed in a bleed inlet in a transition duct. The door is pivotable or rotatable about two or more separate pivot points. The variable bleed valve is operable to open and close an aft bleed slot extending generally radially outwardly from the transition duct and extending between an aft lip located at a downstream or aft end of the door and the transition duct. The variable bleed valve is also operable to open and close a forward bleed slot extending generally radially inwardly into the transition duct and extending between a forward lip located at an upstream or forward end of the door and the transition duct.

The exemplary embodiment of the variable bleed valve operable to transition the door between a first position with the aft bleed slot being open and the forward bleed slot being closed to a second position with the aft bleed slot being closed and the forward bleed slot being open without fully closing the door. The door may pivot or rotate about an axis translatable between the two or more separate pivot points.

The transition duct may have a transition duct conical angle with respect to an engine centerline that is at least about 10 degrees greater than a booster conical angle of a booster outer shroud upstream and adjacent the transition duct.

The gas turbine engine variable bleed apparatus may include a heater in an ice gathering compartment in a radially inner and axially aft section of the fan hub frame for melting ice extracted from the transition duct. The door operable to place the aft bleed slot in fluid communication with an opening from the compartment to the aft bleed slot when the aft bleed slot is opened. The door may be operable to place the aft bleed slot in fluid communication with the compartment by uncovering an opening from the aft bleed slot to the compartment, and sealing the aft lip of the door against a compartment wall of the compartment.

The gas turbine engine variable bleed apparatus may include a bleed valve duct comprising circumferentially spaced apart duct sidewalls extending generally radially outwardly from the door. The bleed valve duct includes a generally axially extending duct outer wall spaced radially apart from the door and a flexible tube connecting an exit of the bleed valve duct at an aft end of the door to a hub frame exit on the hub frame.

Alternatively, an exhaust duct extension of a bleed exhaust duct may extend forwardly into the hub frame from the bleed exhaust duct. The bleed exhaust duct leads away from the hub frame. The exhaust duct extension seals against the bleed valve duct. Flexible exhaust duct seals on the exhaust duct extension sealingly engage flexible valve duct seals on the bleed valve duct.

The gas turbine engine variable bleed apparatus may include circumferentially spaced apart first and second door hinges near the aft end of the door which rotatably hinge the door to the fan hub frame. The axis passes through first and second hinge pins rotatably extending through hinge holes of first and second door hinges. The first and second hinge pins rotatably extend through first and second hinge slots in circumferentially spaced apart first and second hinge lugs fixedly attached to the fan hub frame. The first and second hinge slots may be linear.

The gas turbine engine variable bleed apparatus may be incorporated in an aircraft gas turbine engine including in downstream serial flow communication a fan, a booster, and a high pressure compressor circumscribed about an engine centerline, and a bypass duct spaced radially outwardly from the booster. An annular fan frame supporting a fan casing surrounding the fan and the bypass duct includes an annular outer frame casing, a fan hub frame, and a plurality of circumferentially spaced apart duct struts extending therebetween. A transition duct is located at a radially inner end of the fan hub frame and axially disposed between and in fluid communication with the booster and the high pressure compressor. Bleed exhaust ducts extend from the fan hub frame to the bypass duct and at least one variable bleed valve including the variable bleed valve door is disposed in a bleed inlet in the transition duct.

Radially inner and outer unison rings operably linked to the variable bleed valve may be incorporated for rotating the door and translating the first and second hinge pins through the first and second hinge slots respectively.

The transition duct may be axially disposed between and in fluid communication with relatively low and high pressure compressors.

A method of operating the variable bleed valve includes pivoting or rotating the door about an axis at and translating the axis between two or more separate pivot points, opening and closing the aft bleed slot by translating the axis between two or more separate pivot points, and opening and closing the forward bleed slot by rotating the door about the axis. The method may further include transitioning the door between a first position with the aft bleed slot being open and the forward bleed slot being closed to a second position with the aft bleed slot being closed and the forward bleed slot being open without fully closing the door during the transitioning which may be done by rotating the door about the axis and simultaneously translating the axis during the transitioning.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
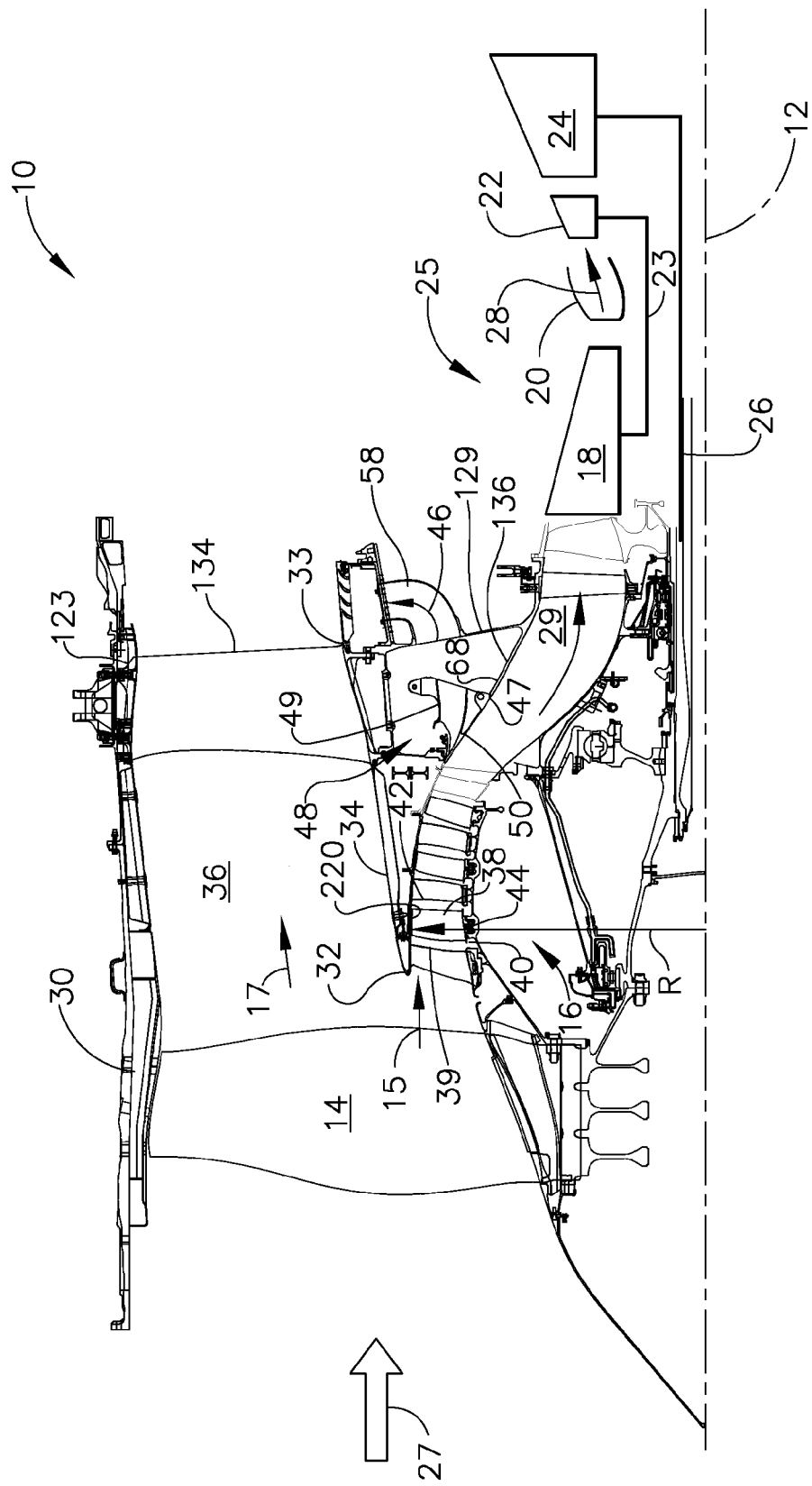
FIG. 1 is a longitudinal part sectional and part diagrammatical view illustration of an exemplary embodiment of an aircraft turbofan gas turbine engine with a two degree of freedom variable bleed valve (VBV).

Illustrated in FIG. 1 is an exemplary aircraft turbofan gas turbine engine 10 circumscribed about an engine centerline 12 and suitably designed to be mounted to a wing or fuselage of an aircraft. The engine 10 includes, in downstream serial flow communication, a fan 14, a booster 16, a high pressure compressor 18, a combustor 20, a high pressure turbine (HPT) 22, and a low pressure turbine (LPT) 24. A core engine 25 includes the HPT or high pressure turbine 22 joined by a high pressure drive shaft 23 to the high pressure compressor 18 and the combustor 20. The LPT or low pressure turbine 24 is joined by a low pressure drive shaft 26 to both the fan 14 and the booster 16.

There are high bypass aircraft gas turbine engines such as some built by Rolls Royce that have more than two compressors and turbines. Rolls Royce, for example, has a three spool engine with three compressors each of which is driven by a different turbine. Thus, the VBV valve and door disclosed herein may be incorporated between two compressors and is not limited to being only between a low pressure compressor such as the booster illustrated herein and a high pressure compressor.

In typical operation, air 27 is pressurized by the fan 14 and produces an inner or core airflow 15 channeled through the booster 16 which further pressurizes the core airflow 15. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24.

A flow splitter 34 surrounding the booster 16 immediately behind the fan 14 includes a sharp leading edge 32 which splits the fan air 27 pressurized by the fan 14 into a radially inner stream (core airflow 15) channeled through the booster 16 and a radially outer stream or bypass airflow 17 is channeled through a bypass duct 36 spaced radially outwardly from the booster 16. A fan casing 30 surrounding the fan 14 and the bypass duct 36 is supported by an annular fan frame 33 circumscribed about the engine centerline 12. The booster 16 includes alternating annular row of booster blades and vanes 38, 42 extending radially outwardly and inwardly across a booster flowpath 39 in a booster duct 40. The annular row of booster blades 38 are suitably joined to the fan 14. The booster 16 is located forward of the fan frame 33 and radially inboard of the flow splitter 34.

The fan frame 33 includes an annular outer frame casing 123, a fan hub frame 129, and a plurality of circumferentially spaced apart duct struts 134 extending therebetween. The duct struts 134 are airfoil shaped since bypass air passes between the adjacent ones thereof. A transition duct 29 also referred to as a gooseneck is located at a radially inner end 136 of the fan hub frame 129 and is axially disposed between and in fluid communication with the booster 16 and the high pressure compressor 18 of the core engine 25. Bleed exhaust ducts 58 lead away from the hub frame 129 to the bypass duct 36.

Figure 2:
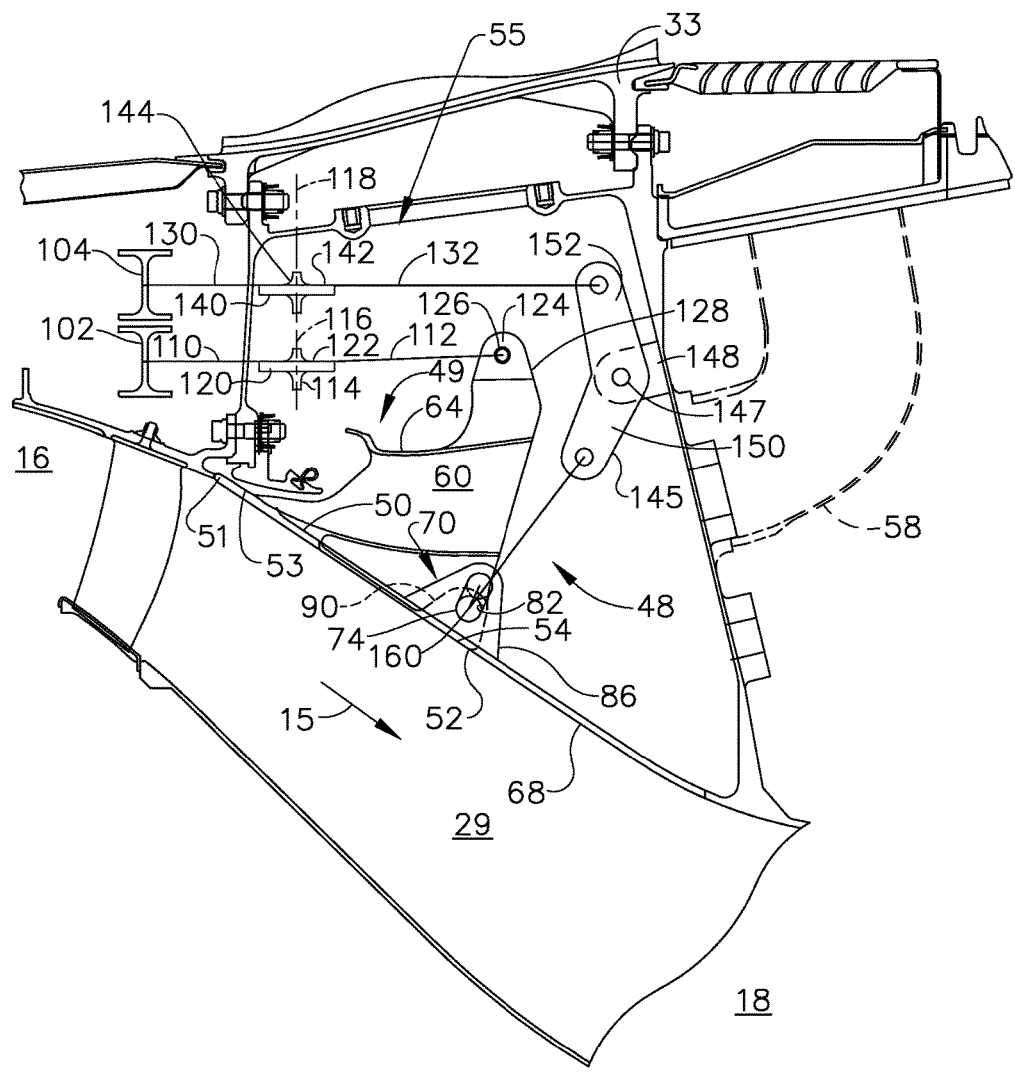
FIG. 2 is an enlarged part sectional and part diagrammatical view illustration of a door of the valve in a closed position in the engine illustrated in FIG. 1.

Referring to FIGS. 1 and 2, a bleed inlet 47, an opening, is disposed in an outer conical wall 68 of a transition duct 29 between booster 16 and the high pressure compressor 18. A variable bleed apparatus 48 is used to bleed the core airflow 15 between booster 16 and the high pressure compressor 18 to prevent the booster 16 from stalling under certain engine operating conditions. The variable bleed apparatus 48 includes a variable bleed valve 49 (VBV) with a variable bleed valve door 50 disposed in the bleed inlet 47. The VBV door 50 is illustrated in FIG. 2 in a closed position completely closing the bleed inlet 47. This closed position is referred to herein as position 4 and is used during high speed steady state engine operation.

The VBV door 50 includes forward and aft lips 51, 52 located at upstream or forward and downstream or aft ends 53, 54 of the door 50. The VBV door 50 is also used to extract ice from the booster and the transition duct 29 before it reaches the high pressure compressor 18 where it can cause stall conditions, airflow instability conditions, and quench the flame or combustion in the combustor 20. A circumferentially disposed plurality of booster bleed paths 46 indicated by the arrows and dotted line labeled 46 extend from the VBV door 50 in the fan hub frame 129 through the bleed exhaust ducts 58 to the bypass duct 36.

Figure 3:
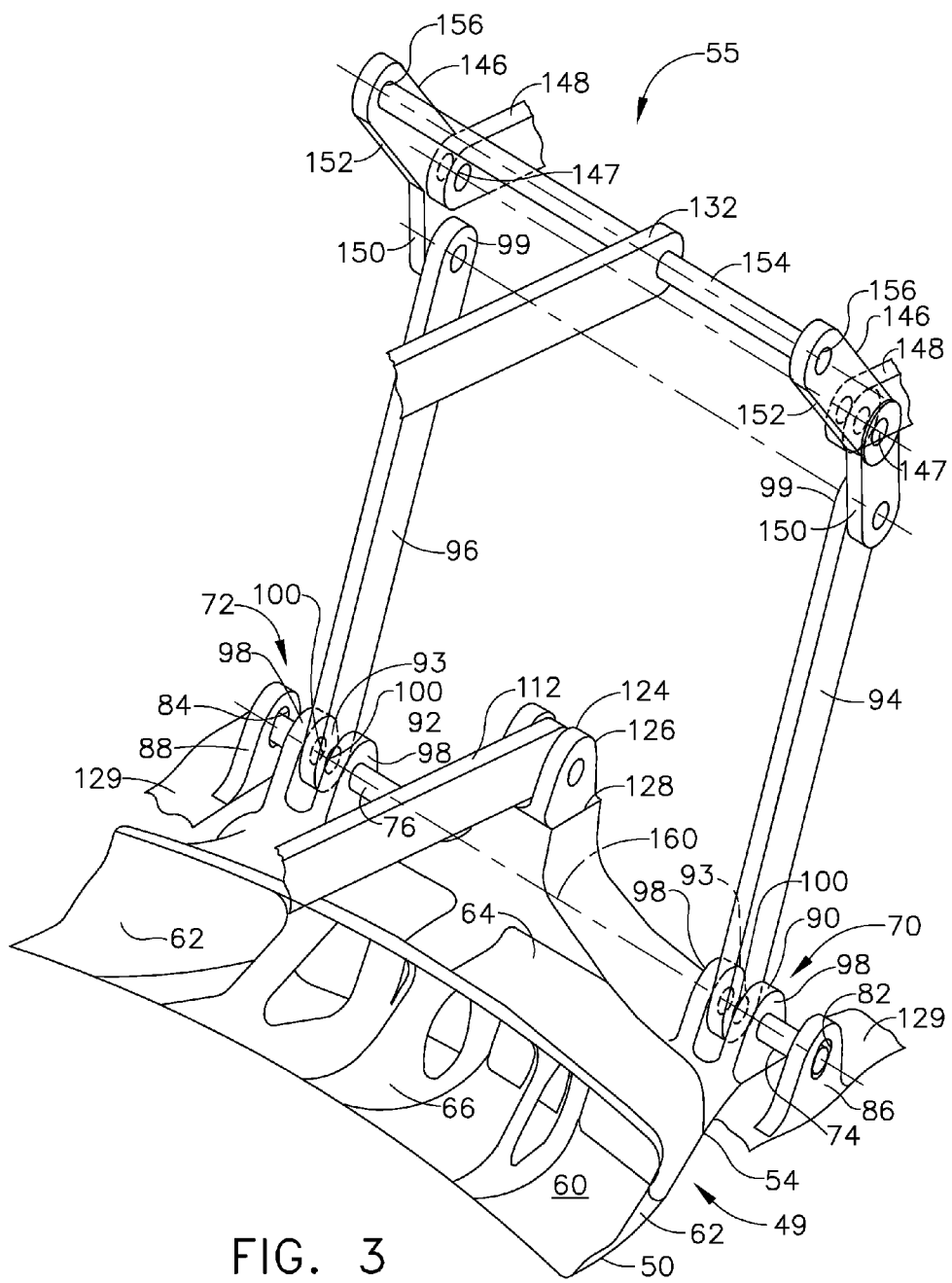
FIG. 3 is a perspective view illustration of a hinge and part of a linkage to pivot the door illustrated in FIG. 2.

Illustrated in FIG. 3 is an exemplary embodiment of the variable bleed valve 49 including a scoop or bleed valve duct 60. The bleed valve duct 60 includes circumferentially spaced apart duct sidewalls 62 extending generally radially outwardly from the VBV door 50 and a generally axially extending duct outer wall 64 spaced radially apart from the VBV door 50. Ribs 66 extend generally radially outwardly from the VBV door 50 to the duct outer wall 64 to provide structural support for the bleed valve duct 60.

Referring back to FIG. 2, the VBV door 50 is attached to linkage 55 that provides it with two rotational degrees of freedom allowing the VBV door 50 to be pivoted or rotated about an axis 160 at two or more separate pivot points which is exemplified by a translatable hinge axis 160. The VBV door 50 is actuated by actuators (not shown) that forwardly and aftwardly axially translate and rotate radially inner and outer unison rings 102, 104 with respect to engine centerline 12. It is well known to operate or rotate VBV doors open and close using actuators, unison rings, and bellcranks for positioning the doors. One example of this may be found in U.S. Pat. No. 3,638,428 to Shipley, et al., Feb. 1, 1972, entitled "BYPASS VALVE MECHANISM".

The linkage 55 includes forward and aft inner links 110, 112 linked to forward and aft inner bellcrank arms 120, 122 of an inner bellcrank 114. The forward inner link 110 operably links the inner unison ring 102 to the forward inner bellcrank arm 120. The aft inner link 112 operably links the aft inner bellcrank arm 122 to an outer clevis 124 of an outer ball joint 126 on a radially outer end 128 of the variable bleed valve 49. The linkage 55 further includes forward and aft outer links 130, 132 linked to forward and aft outer bellcrank arms 140, 142 of an outer bellcrank 144. The forward outer link 130 operably links the outer unison ring 104 to the forward outer bellcrank arm 140. The inner and outer bellcranks 114, 144 pivot about inner and outer bellcrank axes 116, 118 which are fixed with respect to the fan hub frame 129.

Referring to FIGS. 2 and 3, circumferentially spaced apart first and second bent arm levers 145, 146 are pivotably connected to the fan hub frame 129 of the fan frame 33. Each of the first and second bent arm levers 145, 146 include radially inner and outer bent arms 150, 152. Each of the first and second bent arm levers 145, 146 is pivotably connected at a lever pivot point 147 between the inner and outer bent arms 150, 152 to a hub lug 148 mounted to the fan hub frame 129. The first and second bent arm levers 145, 146 are rotatably connected to each other by a cross bar 154 illustrated herein as being cylindrical and disposed through arm holes 156 in each of the outer bent arm 152 of each of the first and second bent arm levers 145, 146.

The VBV door 50 is hinged to the fan hub frame 129 of the fan frame 33 near the aft end 54 of the VBV door 50. The exemplary embodiment of the variable bleed valve 49 includes circumferentially spaced apart VBV first and second door hinges 70, 72 near the aft end 54 of the VBV door 50. The first and second door hinges 70, 72 rotatably connect or hinge the VBV door 50 to the fan hub frame 129. The first and second door hinges 70, 72 include first and second clevises 90, 92 respectively. Radially inner ends 93 of first and second door links 94, 96 are rotatably connected to clevis lugs 98 of the first and second clevises 90, 92 respectively. Radially outer ends 99 of first and second door links 94, 96 are rotatably connected to the radially inner bent arm 150 of the first and second bent arm levers 145, 146 respectively.

Cylindrical first and second hinge pins 74, 76 are rotatably disposed through linearly aligned coaxial hinge holes 100 in the clevis lugs 98 of the first and second clevises 90, 92 of the first and second door hinges 70, 72 and the inner ends 93 of the first and second door links 94, 96 respectively. The VBV door 50 is rotatably and translatably connected to the fan hub frame 129. The cylindrical first and second hinge pins 74, 76 extend through first and second hinge slots 82, 84 in spaced apart first and second hinge lugs 86, 88 respectively. The first and second hinge lugs 86, 88 are fixedly attached to the fan hub frame 129. Thus, the hinge axis 160 passes through the first and second hinge pins 74, 76 which are translatable about which the VBV door 50 is rotatable. The exemplary embodiment of the first and second hinge slots 82, 84 are linear slots so that the first and second hinge pins 74, 76 can only translate linearly.

The aft outer link 132 operably links the aft outer bellcrank arm 142 to the cross bar 154 so that when the aft outer link 132 is moved forwardly and aftwardly by the outer bellcrank 144, the first and second bent arm levers 145, 146 rotate about the respective lever pivot points 147 which are fixed relative to the fan hub frame 129. This moves or translates the first and second hinge pins 74, 76 through first and second hinge slots 82, 84 respectively, thus, translating and positioning the hinge axis 160 and the VBV door 50. The VBV door 50 is, thus, operable to rotate into and out of the transition duct 29 about the hinge axis 160 near the aft end 54 of the VBV door 50. The hinge axis 160 is operable to translate toward and away from the transition duct 29. The exemplary embodiment of the variable bleed valve 49 embodiment includes the hinge axis 160 being operable to translate perpendicularly or along a normal line toward and away from the transition duct 29.

Figure 4:
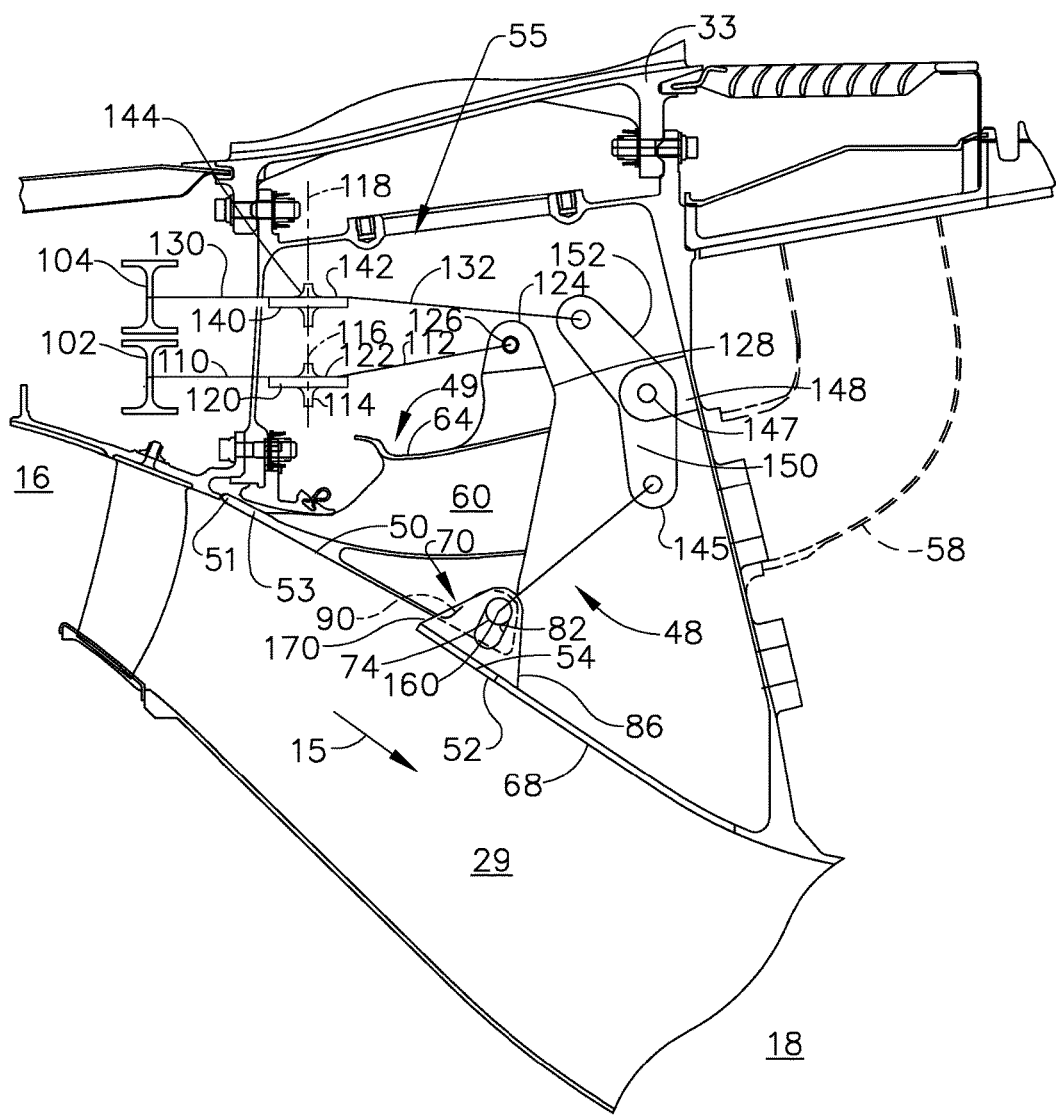
FIG. 4 is a sectional view illustration of an aft slot formed by the door in an outwardly rotated position with respect to a transition duct in the engine illustrated in FIG. 2.
Figure 4A:
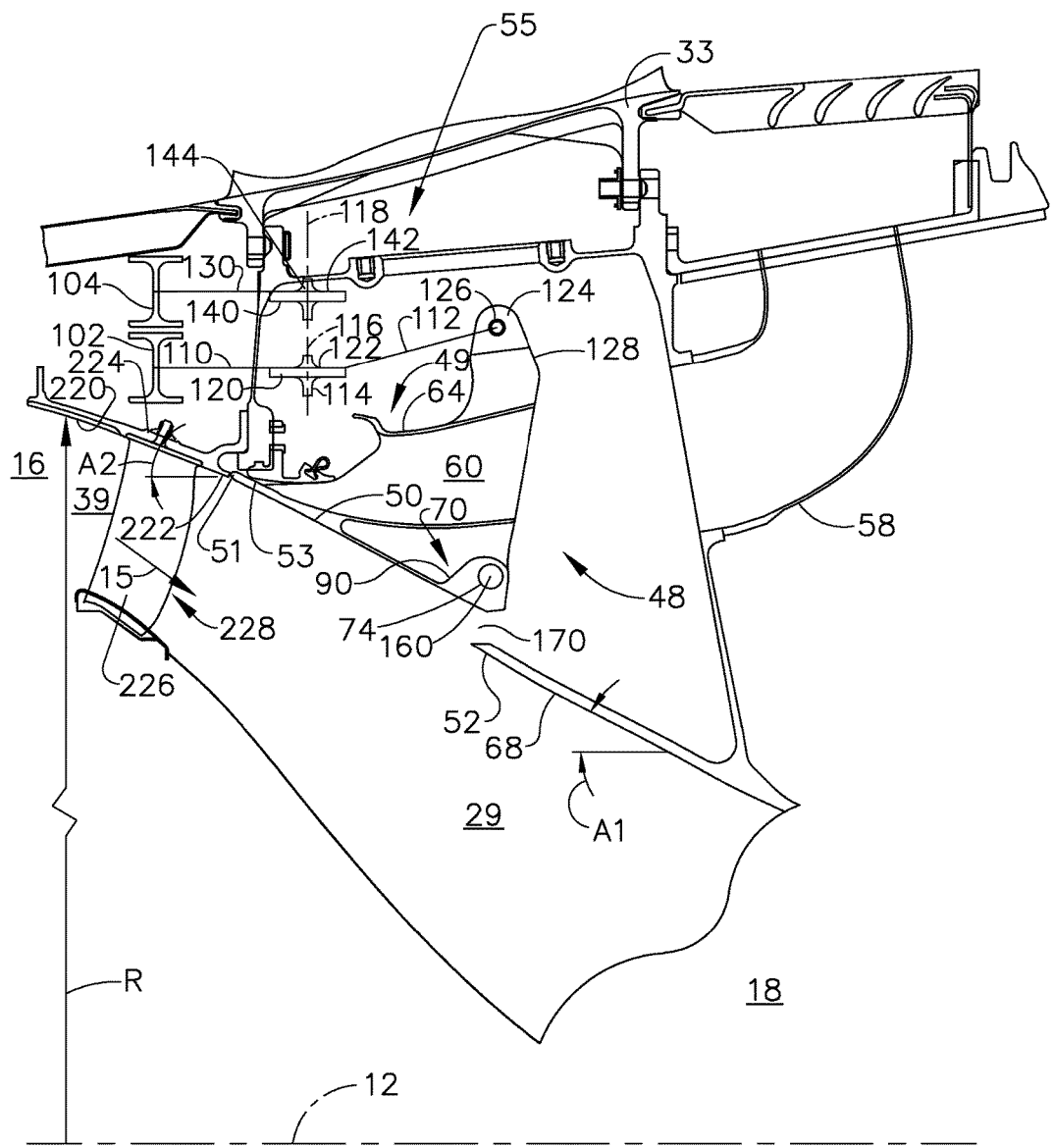
FIG. 4A is a sectional view illustration of a transition duct conical angle of the transition duct and a booster conical angle of a booster outer shroud in the engine illustrated in FIG. 2.

Referring to FIGS. 4 and 4A, the VBV door 50 is translated by actuating or moving the outer unison ring 104 to only open an aft bleed slot 170 extending generally radially outwardly from the transition duct 29. The aft bleed slot 170 extends between the aft lip 52 located at the downstream or aft end 54 of the VBV door 50 and the transition duct 29. The VBV door 50 may also be rotated so that the forward lip 51 located at the upstream or forward end 53 of the VBV door 50 remains in sealing engagement with the bleed inlet 47. Thus, the VBV door 50 is rotated into the fan hub frame 129 about the forward lip 51. The aft bleed slot 170 is opened to extract ice from the booster and the transition duct 29 before it reaches the high pressure compressor 18 where it can cause stall conditions, airflow instability conditions, and quench the flame or combustion in the combustor 20. FIG. 4 illustrates the VBV door 50 with only the aft bleed slot 170 open. This aft slot open and front slot closed position of the VBV door 50 is referred to herein as position 3 and is used during acceleration for high speed ice extraction with limited bleeding of bleed air 19 off of the core airflow 15.

Referring to FIGS. 1 and 4A, the aft bleed slot 170 is not very high and is designed to remove ice from the gooseneck or the transition duct 29 and may do so without removing core airflow 15. In order to enhance the ice removal, a booster outer flowpath 220 has a relatively high radius R, as measured from the engine centerline 12, over the last few stages of the booster 16 and the transition duct 29 performs some of the core airflow 15 turning within the transition duct 29. This flow turning is accomplished by the outer conical wall 68 of the transition duct 29 have a transition duct conical angle A1, with respect to the engine centerline 12, at least about 10 degrees greater than a booster conical angle A2 of a booster outer shroud 222. The booster outer shroud 222 surrounds outer ends 224 of booster outlet guide vanes 226 (OGV) at a booster outlet 228 leading to the transition duct 29.

In a more general embodiment of the engine, the variable bleed valve 49 may be used in a transition duct 29 between adjacent relatively low and high pressure compressors represented herein by the booster 16 and the high pressure compressor 18 respectively. The booster outer shroud 222, booster outlet guide vanes 226, and booster outlet 228 leading to the transition duct 29 are generally representative of a low pressure compressor outer shroud, outlet guide vanes, and compressor outlet respectively.

Core airflow 15 exiting the booster 16 flows linearly on a path that is tangent to the outer flowpath of the booster outlet 228 which is generally the same as the booster outer shroud 222. In an ice shed, the ice particles follow this same path or trajectory with most of the ice being located in the outer portion of the flowpath. Conventionally, the flow direction set by the outer flowpath of the booster outlet 228 is parallel to the VBV door 50. Having the transition duct conical angle A1 greater than the booster conical angle A2 by about 10 degrees or more is more conducive for extracting shed ice at high speed, while minimizing the amount of airflow bleed from the booster discharge and thereby minimizing the exhaust gas temperature (EGT) and other cycle effects.

The core airflow 15 in the booster and transition duct stays attached to the wall, and turns down into the compressor because of its difference in conical angles. However, ice particles have too much mass and inertia to make this turn, and they continue on their straight trajectory out of booster. They then collide with the outer wall of the transition duct and slide along it until the flowpath turns again going into the HPC. When the aft slot is opened up at the aft end of the VBV door, the ice in the outer flowpath either collides with and slides along the bottom of the VBV door into the fan hub frame, or continues on its straight trajectory out of the booster and into the fan hub frame through the aft slot.

Figure 5:
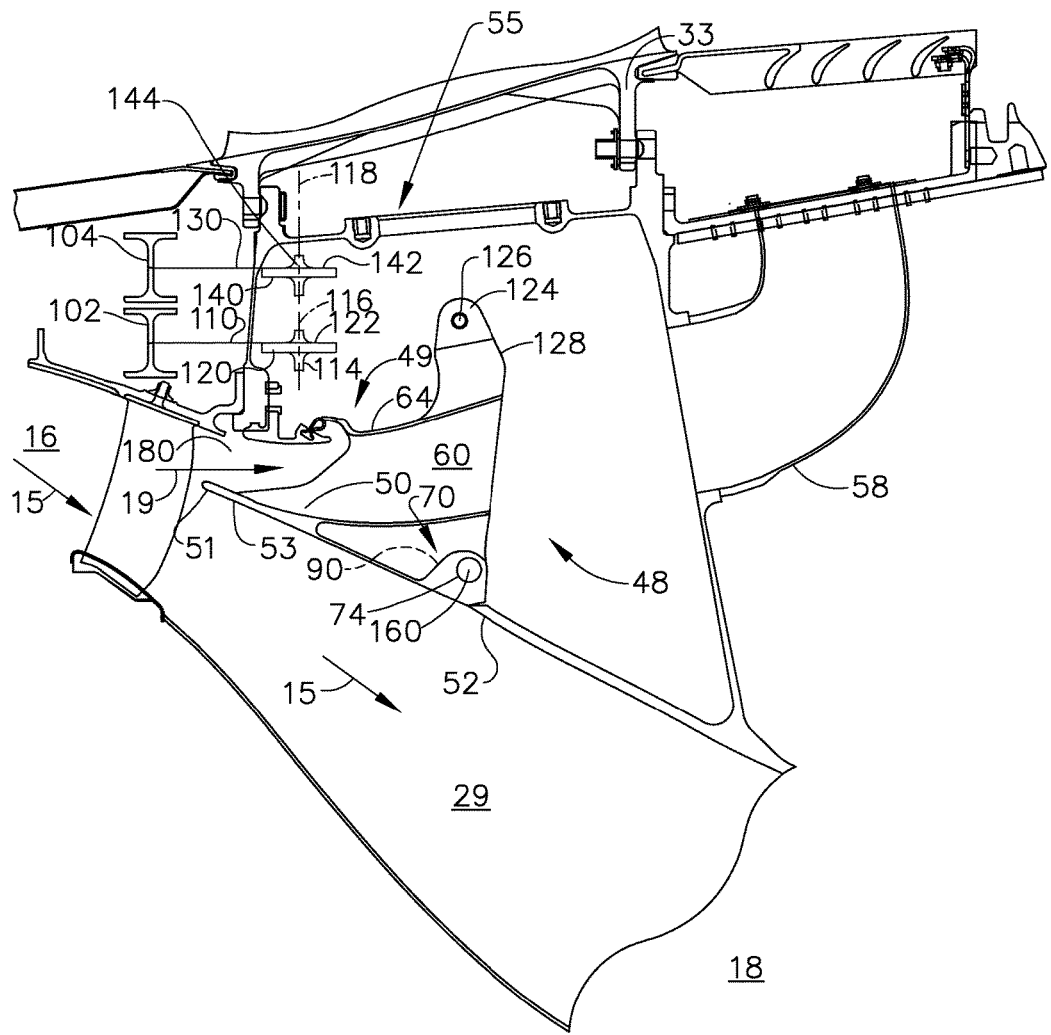
FIG. 5 is a sectional view illustration of a forward slot formed by the door in an inwardly rotated position with respect to the transition duct in the engine illustrated in FIG. 2.

Illustrated in FIG. 5, is a forward bleed slot 180 which is opened by rotating the VBV door 50 generally radially inwardly into the transition duct 29. The forward bleed slot 180 is opened by actuating or moving the inner unison ring 102 which, in turn, rotates the VBV door 50 about the hinge axis 160. The inner unison ring 102 rotates the inner bellcrank 114 and its inner bellcrank arm 122 which, in turn, moves the aft inner link 112 operably linked to the radially outer end 128 of the VBV door 50. The forward bleed slot 180 extends between the forward lip 51 located at the upstream or forward end 53 of the VBV door 50 and the transition duct 29. Thus, the VBV door 50 is rotated away from the fan hub frame 129 and radially into the transition duct 29 and is rotated generally about aft lip 52.

In this position of the VBV door 50, the forward bleed slot 180 is open and the aft bleed slot 170 is closed. FIG. 5 illustrates the VBV door 50 with only the aft bleed slot 170 open. This forward bleed slot 180 open and aft bleed slot 170 closed position is referred to herein as position 1 and is used during idle, early in accels, and during on chops for high ice extraction with moderate to maximum bleeding of bleed air 19 off of the core airflow 15. At these low engine speeds, the VBV door 50 is rotated into the core airflow 15 in the transition duct 29 as shown below FIG. 5, thus, bleeding or extracting bleed air 19 off of the core airflow 15. The bleed air 19 flows across the VBV door 50, through the bleed valve duct 60, through the bleed exhaust ducts 58, and to the bypass duct 36.

When the engine goes from low to high speed, the VBV door 50 transitions from an ice extraction position illustrated in FIG. 4 in which the aft bleed slot 170 is open and the forward bleed slot 180 is closed to a core bleed position illustrated in FIG. 5 in which the aft bleed slot 170 is closed and the forward bleed slot 180 is open. After the engine reaches a stabilized power condition the VBV door 50 is placed in a fully closed position as illustrated in FIG. 2. When the engine goes from low to high speed, the VBV door 50 transitions to an ice extraction position illustrated in FIG. 4 in which the aft bleed slot 170 is open and the forward bleed slot 180 is closed from a core bleed position illustrated in FIG. 5 in which the aft bleed slot 170 is closed and the forward bleed slot 180 is open.

Figure 6:
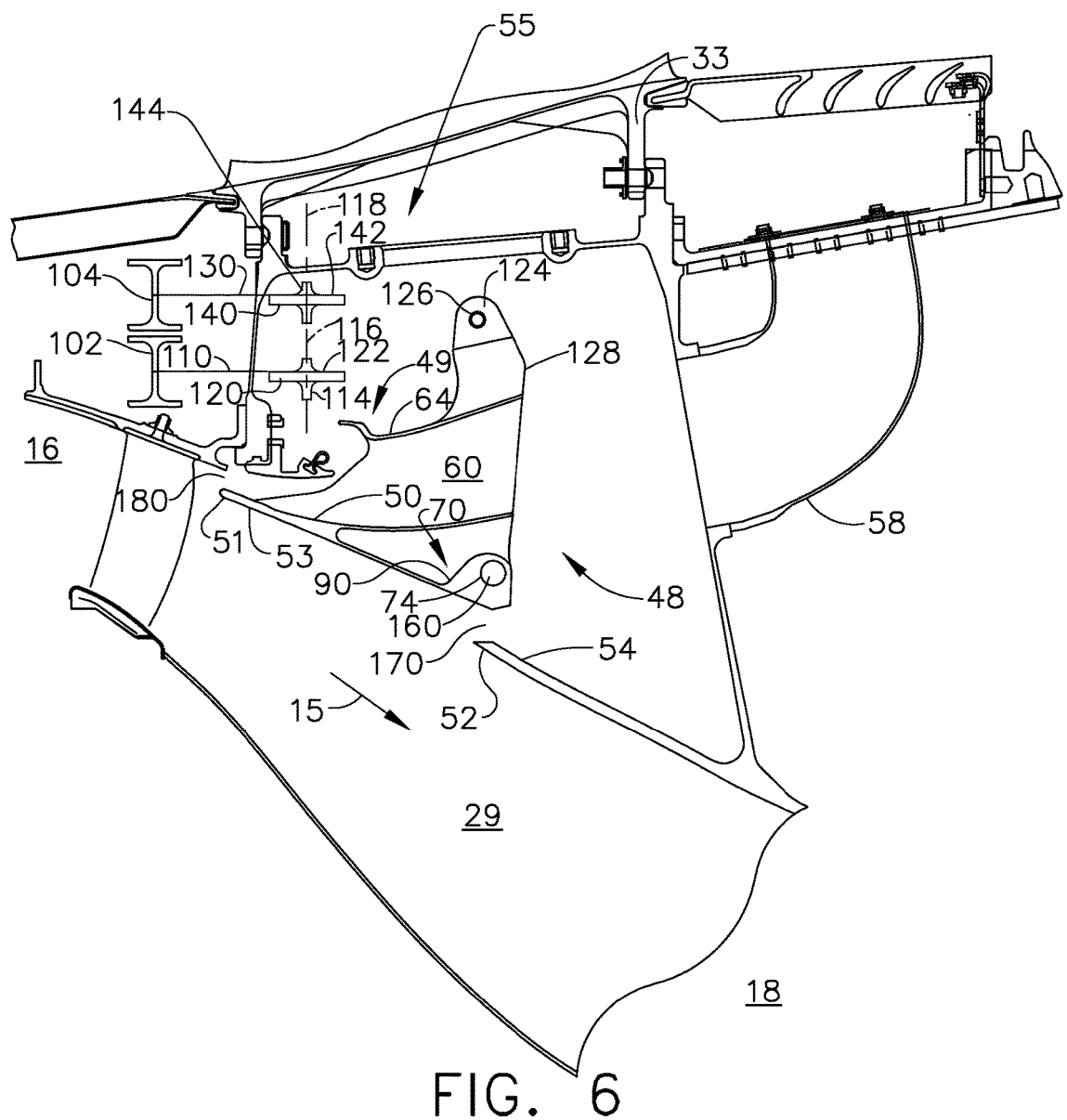
FIG. 6 is a sectional view illustration of the door in a partially outwardly and a partially inwardly rotated positions in the transition duct in the engine illustrated in FIG. 2.

During this transition, it is desirable to bleed air from the core airflow 15 in the transition duct 29 during the entire time. Therefore, during transition, the VBV door 50 avoids going into to the fully closed position 4, illustrated in FIG. 2. When in transition, bleed air 19 is bled into the fan hub frame 129 through the forward bleed slot 180 at the forward lip 51, the upstream or forward end 53 of the VBV door 50 and through the aft bleed slot 170 at the aft lip 52 at the downstream or aft end 54 of the VBV door 50. During this transition, the VBV door 50 is rotated about the axis 160 and the axis 160 is simultaneously translated. An example of this transition is illustrated in FIG. 6 with both the aft and forward bleed slots 170, 180 in open positions. This front slot open and aft slot open position of the VBV door 50 is referred to herein as position 6 and is used during acceleration for high speed ice extraction with limited bleeding of bleed air 19 off of the core airflow 15.

During one engine operation, the engine starts out in a steady state idle condition with the VBV door in position 1 with the forward bleed slot 180 open and aft bleed slot 170 closed as illustrated in FIG. 5. The engine is then accelerated from the steady state idle condition to a high power condition with the VBV door in transitioning in sequence from position 1 to position 2 to position 3 to position 4. These positions are described above and illustrated in FIGS. 5, 6, 4, 2, respectively. For steady state takeoff, the engine operated at a high power condition in which the VBV door is in position 4 with the VBV door 50 completely closed as illustrated in FIG. 2.

Figure 7:
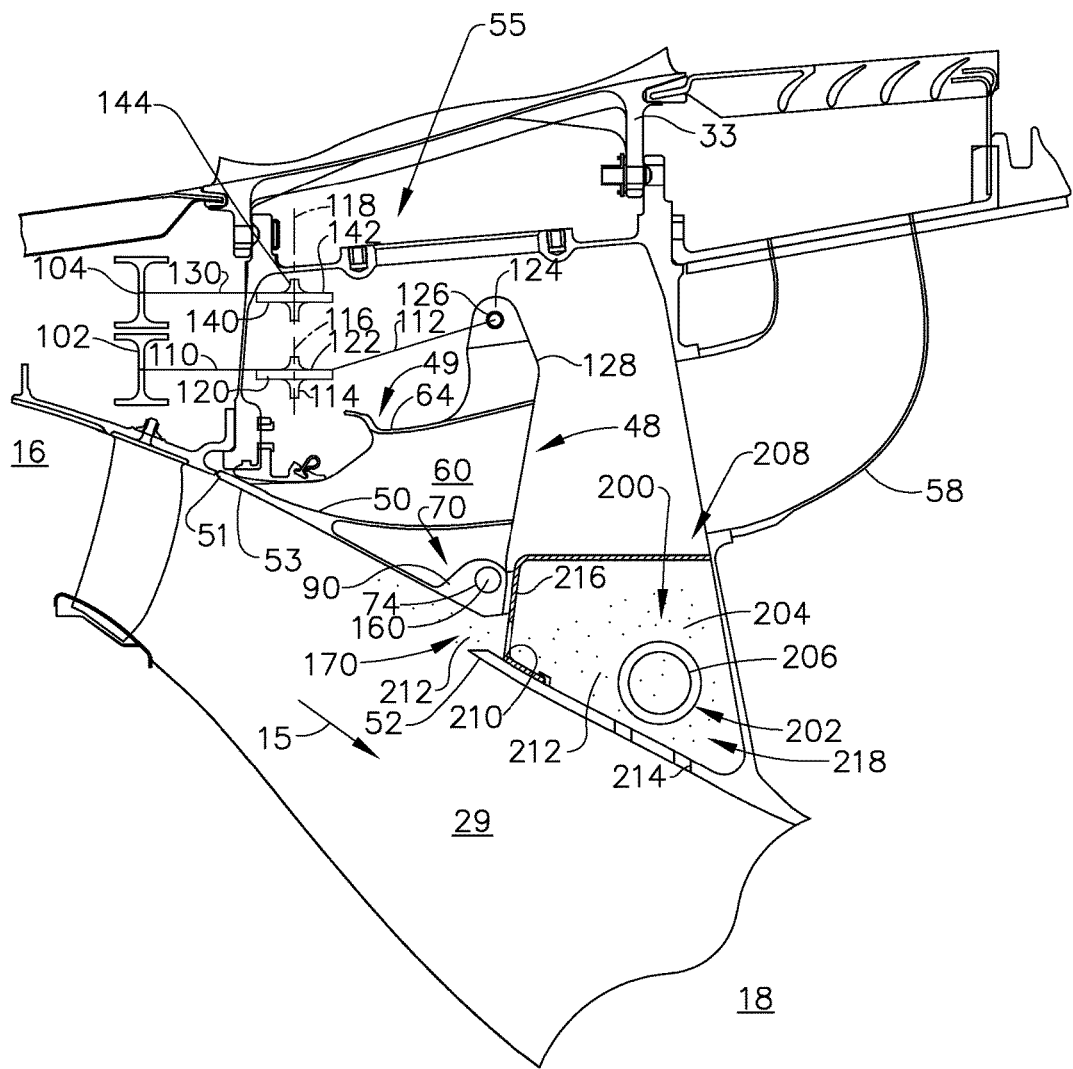
FIG. 7 is a diagrammatical view illustration of a heating system for melting ice extracted by the VBV of the engine illustrated in FIG. 1.

Illustrated in FIG. 7, is an exemplary embodiment of the variable bleed apparatus 48 including a heating system 200 for melting ice extracted from the core airflow 15 in the transition duct 29. The heating system 200 includes a heater 202 illustrated herein as heating pipes or tubes 206 in an ice gathering compartment 204 in a radially inner and axially aft section 208 of the fan hub frame 129.

An opening 210 from the compartment 204 to the aft bleed slot 170 is uncovered when the aft bleed slot 170 is opened and the aft lip 52 of the VBV door 50 seals against a compartment wall 216 of the compartment 204. This allows ice 212 to be extracted from the booster and the transition duct 29 into the compartment 204 and very little, if any, of the core airflow 15 to be removed from the transition duct 29. The ice 212 in the compartment 204 is melted and flows through weep holes 214 in the outer conical wall 68 of the transition duct 29 bounding a radially inner end 218 of the compartment 204 and is exhausted into the core airflow 15 in the transition duct 29.

Figure 8:
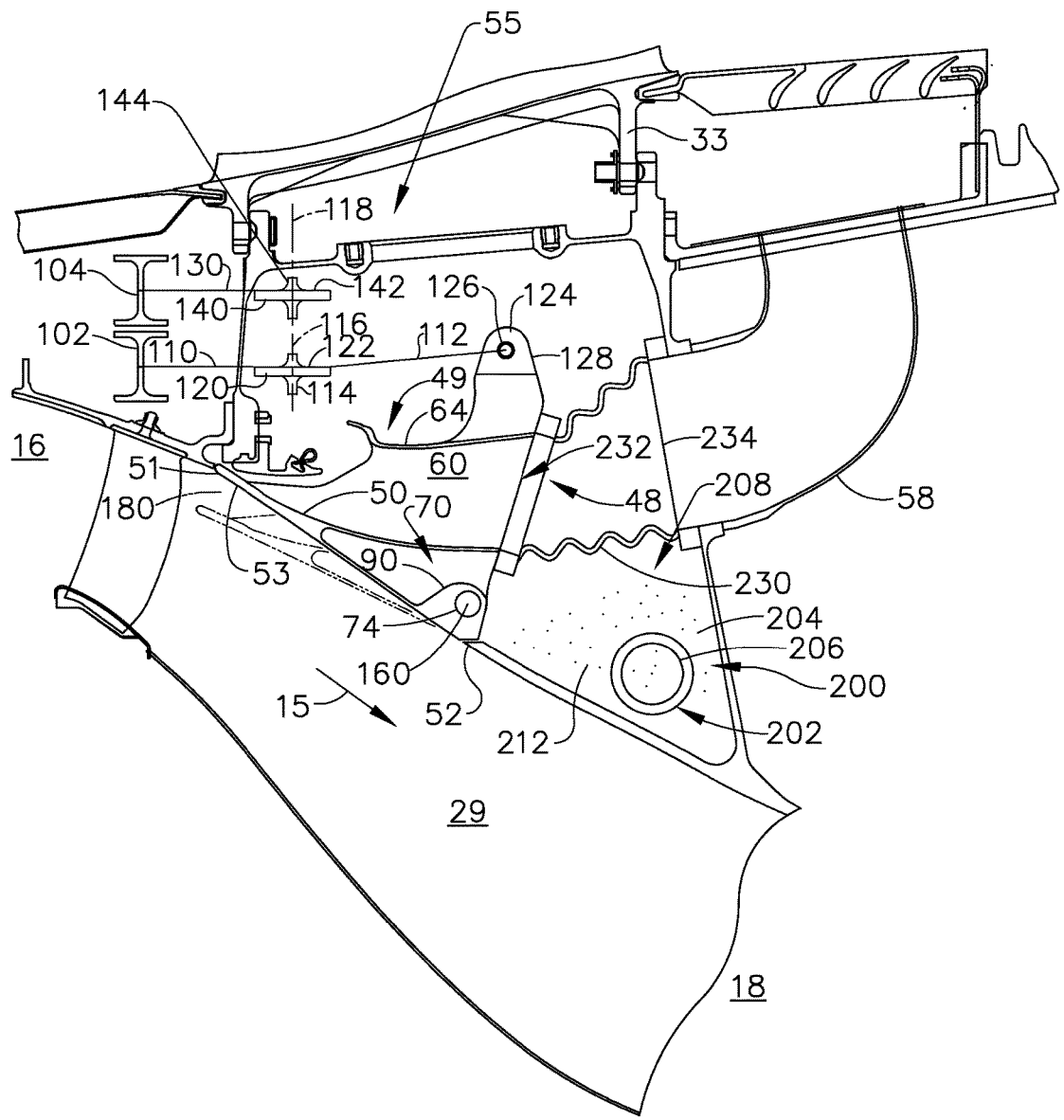
FIG. 8 is a diagrammatical view illustration of a flexible baffled tube connecting an the exit of the VBV bleed valve duct and an inlet of a VBV exhaust duct between a fan frame hub and a bypass duct of the engine illustrated in FIG. 1.

Illustrated in FIG. 8 is a flexible baffled or bellows tube 230 connecting an exit 232 of the bleed valve duct 60 at the aft end 54 of the VBV door 50 to a hub frame exit 234 on the hub frame 129. The bleed exhaust duct 58 extends from the hub frame exit 234 to the bypass duct 36. The bleed air 19 bled off of the core airflow 15 and flowed through the forward bleed slot 180 when it is opened by rotating the VBV door 50 is guided by the baffled tube 230 completely and efficiently to the bleed exhaust duct 58. The baffled tube 230 also isolates ice that has been entrained in the bleed air 19 and extracted from the core airflow 15 through the forward bleed slot 180.

Figure 9:
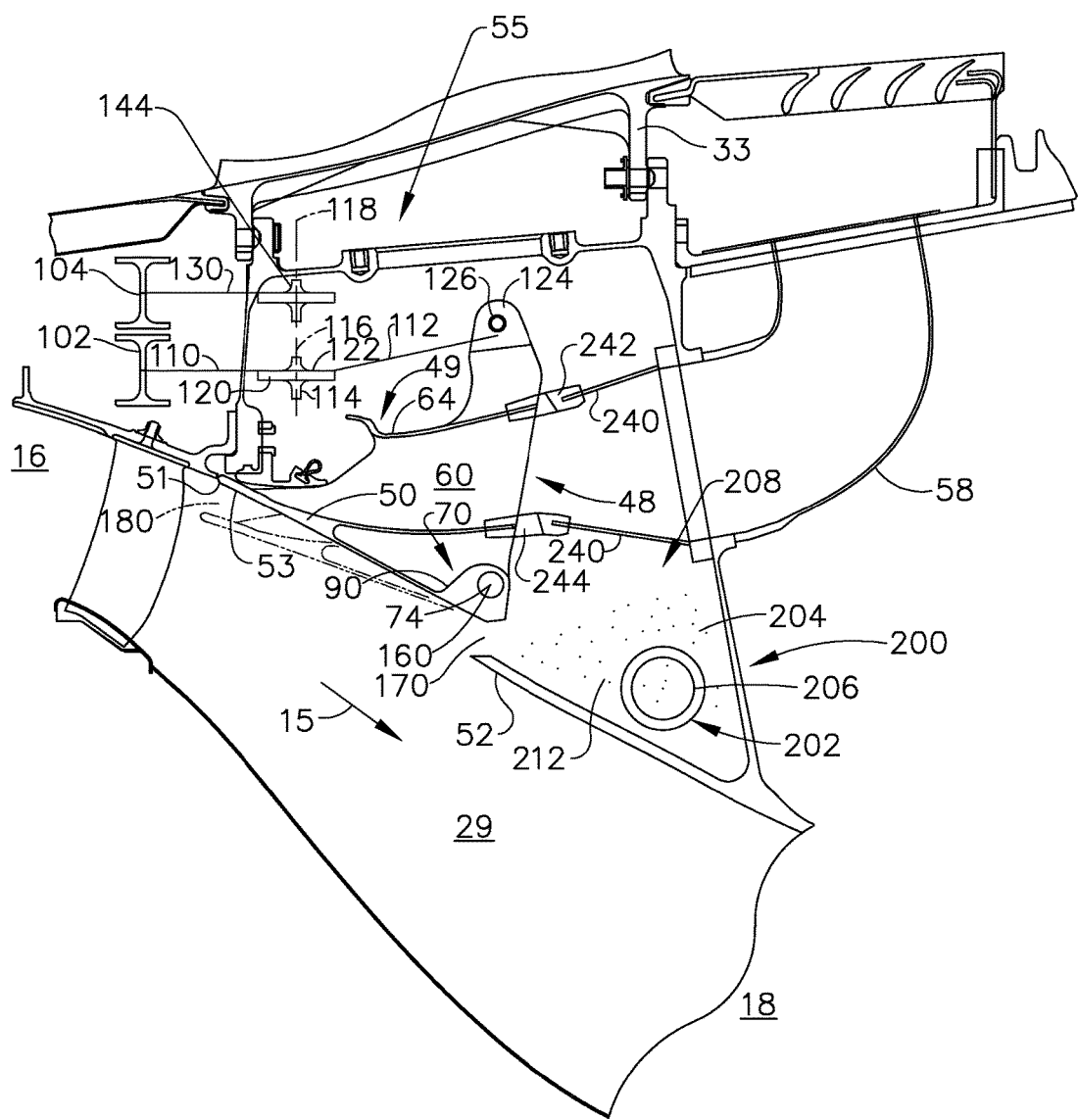
FIG. 9 is a diagrammatical view illustration of an extended VBV exhaust duct extending into the fan frame hub of the engine illustrated in FIG. 1.

Illustrated in FIG. 9 is a VBV exhaust duct extension 240 of the bleed exhaust duct 58. The exhaust duct extension 240 extends forwardly into the hub frame 129 from the bleed exhaust duct 58 and seals against the bleed valve duct 60 on the VBV door 50. Flexible exhaust duct seals 242 on the exhaust duct extension 240 seal with flexible valve duct seals 244 on the bleed valve duct 60. The bleed air 19 bled off of the core airflow 15 and flowed through the forward bleed slot 180 when it is opened by rotating the VBV door 50 is guided by the exhaust duct extension 240 completely and efficiently to the bleed exhaust duct 58 between the fan hub frame 129 and the bypass duct 36. The exhaust duct extension 240 also isolates ice that has been entrained in the bleed air 19 and extracted from the core airflow 15 through the forward bleed slot 180.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

The invention claimed is:

1. A gas turbine engine variable bleed apparatus comprising:
   a variable bleed valve including a single variable bleed valve door disposed in a bleed inlet in a transition duct,
   the single variable bleed valve door pivotable or rotatable about two or more separate pivot points,
   the variable bleed valve operable to open and close an aft bleed slot extending generally radially outwardly from the transition duct and extending between an aft lip located at a downstream or aft end of the single variable bleed valve door and the transition duct, and
   the variable bleed valve operable to open and close a forward bleed slot extending generally radially inwardly into the transition duct and extending between a forward lip located at an upstream or forward end of the single variable bleed valve door and the transition duct, and
   further comprising the variables bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

2. The gas turbine engine variable bleed apparatus as claimed in claim 1 further comprising the single variable bleed valve door pivotable or rotatable about an axis translatable between the two or more separate pivot points.

3. The gas turbine engine variable bleed apparatus as claimed in claim 1 further comprising:
the transition duct having a transition duct conical angle with respect to an engine centerline,
a booster conical angle of a booster outer shroud upstream and adjacent the transition duct, and
the transition duct conical angle being at least about 10 degrees greater than the booster conical angle.

4. The gas turbine engine variable bleed apparatus as claimed in claim 3 further comprising:
a heater for melting ice extracted from the transition duct,
the heater in an ice gathering compartment in a radially inner and axially aft section of a fan hub frame located radially outwardly of the transition duct,
an opening from the compartment to the aft bleed slot, and
the single variable bleed valve door operable to place the aft bleed slot in fluid communication with the compartment when the aft bleed slot is opened.

5. The gas turbine engine variable bleed apparatus as claimed in claim 4 further comprising the variable bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

6. The gas turbine engine variable bleed apparatus as claimed in claim 5 further comprising the single variable bleed valve door pivotable or rotatable about an axis translatable between the two or more separate pivot points.

7. The gas turbine engine variable bleed apparatus as claimed in claim 6 further comprising the single variable bleed valve door operable to place the aft bleed slot in fluid communication with the compartment by uncovering an opening from the aft bleed slot to the compartment, and sealing the aft lip of the single variable bleed valve door against a compartment wall of the compartment.

8. The gas turbine engine variable bleed apparatus as claimed in claim 3 further comprising:
a bleed valve duct comprising circumferentially spaced apart duct sidewalls extending generally radially outwardly from the single variable bleed valve door,
the bleed valve duct further comprising a generally axially extending duct outer wall spaced radially apart from the single variable bleed valve door, and
a flexible tube connecting an exit of the bleed valve duct at an aft end of the single variable bleed valve door to a hub frame exit on a fan hub frame located radially outwardly of the transition duct.

9. The gas turbine engine variable bleed apparatus as claimed in claim 8 further comprising the variable bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

10. The gas turbine engine variable bleed apparatus as claimed in claim 9 further comprising the single variable bleed valve door pivotable or rotatable about an axis translatable between the two or more separate pivot points.

11. The gas turbine engine variable bleed apparatus as claimed in claim 10 further comprising the single variable bleed valve door operable to place the aft bleed slot by uncovering an opening from the aft bleed slot to the compartment, and sealing the aft lip of the single variable bleed valve door against a compartment wall of the compartment.

12. The gas turbine engine variable bleed apparatus as claimed in claim 3 further comprising:
a bleed valve duct comprising circumferentially spaced apart duct sidewalls extending generally radially outwardly from the single variable bleed valve door,
the bleed valve duct further comprising a generally axially extending duct outer wall spaced radially apart from the single variable bleed valve door,
a bleed exhaust duct leading away from a fan hub frame located radially outwardly of the transition duct,
an exhaust duct extension of the bleed exhaust duct extending forwardly into the hub frame from the bleed exhaust duct, and
the exhaust duct extension sealing against the bleed valve duct.

13. The gas turbine engine variable bleed apparatus as claimed in claim 12 further comprising flexible exhaust duct seals on the exhaust duct extension sealingly engaged with flexible valve duct seals on the bleed valve duct.

14. The gas turbine engine variable bleed apparatus as claimed in claim 12 further comprising the variable bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

15. The gas turbine engine variable bleed apparatus as claimed in claim 14 further comprising the single variable bleed valve door pivotable or rotatable about an axis translatable between the two or more separate pivot points.

16. The gas turbine engine variable bleed apparatus as claimed in claim 15 further comprising the single variable bleed valve door operable to place the aft bleed slot in fluid communication with the compartment by uncovering an opening from the aft bleed slot to the compartment, and sealing the aft lip of the single variable bleed valve door against a compartment wall of the compartment.

17. The gas turbine engine variable bleed apparatus as claimed in claim 3 further comprising:
circumferentially spaced apart first and second single variable bleed valve door hinges near the aft end of the single variable bleed valve door rotatably hinging the single variable bleed valve door to a fan hub frame located radially outwardly of the transition duct,
the axis passing through first and second hinge pins, and
the first and second hinge pins extending through first and second hinge slots in circumferentially spaced apart first and second hinge lugs fixedly attached to the fan hub frame and through hinge holes in clevis lugs of the first and second door hinges respectively.

18. The gas turbine engine variable bleed apparatus as claimed in claim 17 wherein the first and second hinge slots are linear.

19. An aircraft gas turbine engine comprising:
in downstream serial flow communication a fan, a booster, and a high pressure compressor circumscribed about an engine centerline;
a bypass duct spaced radially outwardly from the booster;

an annular fan frame supporting a fan casing surrounding the fan and the bypass duct;

the fan frame including an annular outer frame casing, a fan hub frame, and a plurality of circumferentially spaced apart duct struts extending therebetween;

a transition duct located at a radially inner end of the fan hub frame and axially disposed between and in fluid communication with the booster and the high pressure compressor;

bleed exhaust ducts extending from the fan hub frame to the bypass duct;

at least one variable bleed valve including a single variable bleed valve door disposed in a bleed inlet in the transition duct;

the single variable bleed valve door pivotable or rotatable about two or more separate pivot points;

the variable bleed valve operable to open and close an aft bleed slot extending generally radially outwardly from the transition duct and extending between an aft lip located at a downstream or aft end of the single variable bleed valve door and the transition duct; and the variable bleed valve operable to open and close a forward bleed slot in fluid communication with at least one of the bleed exhaust ducts and extending generally radially inwardly into the transition duct and extending between a forward lip located at an upstream or forward end of the single variable bleed valve door and the transition duct; and further comprising the variable bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

20. The aircraft gas turbine engine as claimed in claim 19 further comprising the single variable bleed valve door pivotable or rotatable about an axis translatable between the two or more separate pivot points.

21. The aircraft gas turbine engine as claimed in claim 19 further comprising:

the transition duct having a transition duct conical angle with respect to an engine centerline, a booster conical angle of a booster outer shroud upstream and adjacent the transition duct, and the transition duct conical angle being at least about 10 degrees greater than the booster conical angle.

22. The aircraft gas turbine engine as claimed in claim 21 further comprising the single variable bleed valve door pivotable or rotatable about an axis translatable between the two or more separate pivot points.

23. The aircraft gas turbine engine as claimed in claim 21 further comprising:

the variable bleed valve including a bleed valve duct having circumferentially spaced apart duct sidewalls extending generally radially outwardly from the single variable bleed valve door and a generally axially extending duct outer wall spaced radially apart from the single variable bleed valve door;

circumferentially spaced apart first and second door hinges near the aft end of the door rotatably hinging the door to the fan hub frame;

the axis passing through first and second hinge pins; and the first and second hinge pins extending through first and second hinge slots in circumferentially spaced apart first and second hinge lugs fixedly attached to the fan hub frame and through hinge holes in clevis lugs of the first and second door hinges respectively.

24. The aircraft gas turbine engine as claimed in claim 23 wherein the first and second hinge slots are linear.

25. The aircraft gas turbine engine as claimed in claim 24 further comprising radially inner and outer unison rings operably linked to the variable bleed valve for rotating the single variable bleed valve door and translating the first and second hinge pins through the first and second hinge slots respectively.

26. An aircraft gas turbine engine comprising:

in downstream serial flow communication a fan, a low pressure compressor, and a high pressure compressor circumscribed about an engine centerline;

a bypass duct spaced radially outwardly from a booster;

an annular fan frame supporting a fan casing surrounding the fan and the bypass duct;

the fan frame including an annular outer frame casing, a fan hub frame, and a plurality of circumferentially spaced apart duct struts extending therebetween;

a transition duct located at a radially inner end of the fan hub frame and axially disposed between and in fluid communication with the low pressure compressor and the high pressure compressor;

bleed exhaust ducts extending from the fan hub frame to the bypass duct;

at least one variable bleed valve including a single variable bleed valve door disposed in a bleed inlet in the transition duct;

the single variable bleed valve door pivotable or rotatable about two or more separate pivot points;

the variable bleed valve operable to open and close an aft bleed slot extending generally radially outwardly from the transition duct and extending between an aft lip located at a downstream or aft end of the single variable bleed valve door and the transition duct; and the variable bleed valve operable to open and close a forward bleed slot in fluid communication with at least one of the bleed exhaust ducts and extending generally radially inwardly into the transition duct and extending between a forward lip located at an upstream or forward end of the single variable bleed valve door and the transition duct; and further comprising the variable bleed valve operable to transition the single variable bleed valve door between a first position with the aft bleed slot being open and the forward bleed slot being closed to a second position with the aft bleed slot being closed and the forward bleed slot being open without fully closing the single variable bleed valve door.

27. The aircraft gas turbine engine as claimed in claim 26 further comprising the single variable bleed valve door pivotable or rotatable about an axis translatable between the two or more separate pivot points.

28. The aircraft gas turbine engine as claimed in claim 26 further comprising:

the transition duct having a transition duct conical angle with respect to an engine centerline, a low pressure compressor conical angle of a low pressure compressor outer shroud upstream and adjacent the transition duct, and the transition duct conical angle being at least about 10 degrees greater than the low pressure compressor conical booster conical angle.

29. The aircraft gas turbine engine as claimed in claim 28 further comprising:

the variable bleed valve including a bleed valve duct having circumferentially spaced apart duct sidewalls extending generally radially outwardly from the single variable bleed valve door and a generally axially extending duct outer wall spaced radially apart from the single variable bleed valve door;

circumferentially spaced apart first and second door hinges near the aft end of the single variable bleed valve door rotatably hinging the single variable bleed valve door to the fan hub frame;

the axis passing through first and second hinge pins; and the first and second hinge pins extending through first and second hinge slots in circumferentially spaced apart first and second hinge lugs fixedly attached to the fan hub frame and through hinge holes in clevis lugs of the first and second door hinges respectively.

30. A method of operating a variable bleed valve including a single variable bleed valve door disposed in a bleed inlet in a transition duct, the method comprising:

pivoting or rotating the single variable bleed valve door about an axis at and translating the axis between two or more separate pivot points, opening and closing an aft bleed slot extending generally radially outwardly from the transition duct and extending between an aft lip located at a downstream or aft end of the single variable bleed valve door and the transition duct by translating the axis between two or more separate pivot points, and opening and closing a forward bleed slot extending generally radially inwardly into the transition duct and extending between a forward lip located at an upstream or forward end of the single variable bleed valve door and the transition duct by rotating the single variable bleed valve door about the axis, and further comprising transitioning the single variable bleed valve door between a first position with the aft bleed slot being open and the forward bleed slot being closed to a second position with the aft bleed slot being closed and the forward bleed slot being open without fully closing the single variable bleed valve door during the transitioning.

31. The method as claimed in claim 30 further comprising rotating the single variable bleed valve door about the axis and simultaneously translating the axis during the transitioning.

32. The method as claimed in claim 30 further comprising turning core airflow flowing out of a booster in the transition duct wherein the booster is directly upstream of the transition duct.

33. The method as claimed in claim 30 further comprising the turning being caused by the transition duct having a transition duct conical angle with respect to an engine centerline, a booster outer shroud upstream and adjacent the transition duct having a booster conical angle, and the transition duct conical angle being at least about 10 degrees greater than the booster conical angle.

* * * * *

UNITED STATES PATENT AND TRADEMARK OFFICE
CERTIFICATE OF CORRECTION

PATENT NO.         : 9,518,513 B2
APPLICATION NO.    : 13/750346
DATED              : December 13, 2016
INVENTOR(S)        : Pritchard, Jr. et al.

It is certified that error appears in the above-identified patent and that said Letters Patent is hereby corrected as shown below:

In the Specification

In Column 4, Line 56, delete "an the" and insert -- the --, therefor.

In Column 8, Line 42, delete "HPC." and insert -- HPT. --, therefor.

In Columns 9 & 10, Lines 58-67 & 1-2, delete "An opening 210 .................. transition duct 29." and insert the same at Line 57, after "129." as a continuation paragraph.

In the Claims

In Column 10, Line 64, in Claim 1, delete "variables" and insert -- variable --, therefor.

Signed and Sealed this
Ninth Day of May, 2017

Michelle K. Lee
*Director of the United States Patent and Trademark Office*